April 7, 1942.　　　C. S. COCKERELL ET AL　　　2,279,031
RADIO NAVIGATION AID
Filed Oct. 22, 1938　　　2 Sheets—Sheet 1
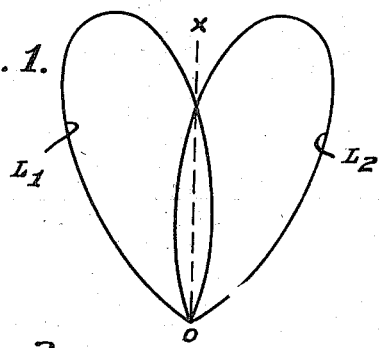
FIG. 1.
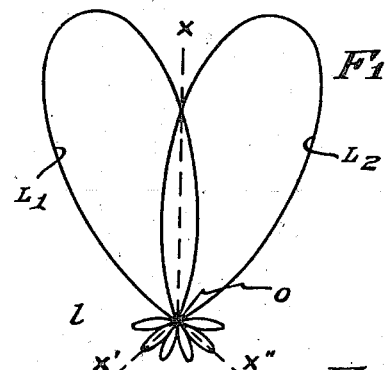
FIG. 2.
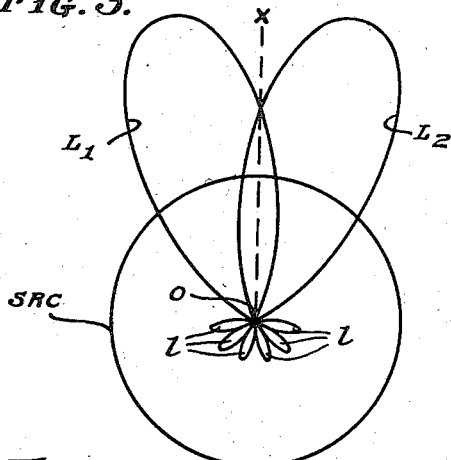
FIG. 3.
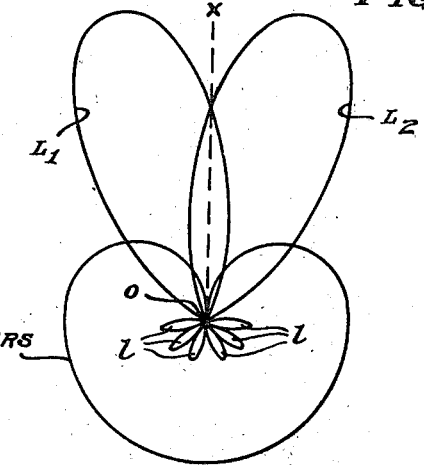
FIG. 4.
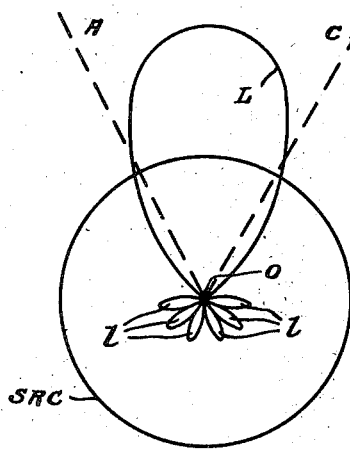
FIG. 5.
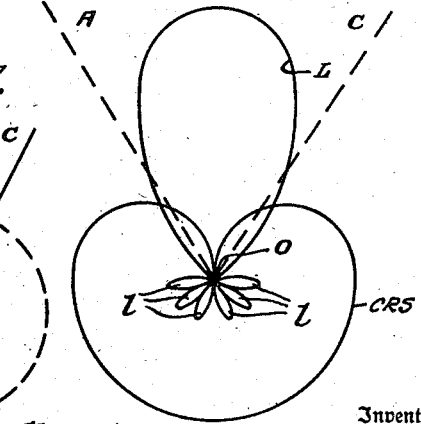
FIG. 6.
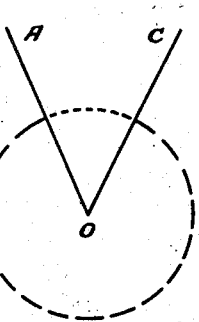
FIG. 7.
Inventors
Christopher S. Cockerell
John G. Robb
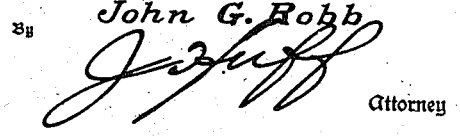
By
Attorney April 7, 1942.    C. S. COCKERELL ET AL    2,279,031
RADIO NAVIGATION AID
Filed Oct. 22, 1938    2 Sheets-Sheet 2

Inventors
Christopher S. Cockerell
& John G. Robb
Attorney

Patented Apr. 7, 1942

2,279,031

UNITED STATES PATENT OFFICE 2,279,031

RADIO NAVIGATION AID

Christopher Sydney Cockerell, Danbury, and John Glover Robb, Richmond, England, assignors to Radio Corporation of America, a corporation of Delaware Application October 22, 1938, Serial No. 236,542
In Great Britain October 29, 1937

3 Claims. (Cl. 250—11)

This invention relates to navigation-aiding radio transmitters and has for its object to provide improved transmitters adapted to assist aircraft or other vessels to proceed along a predetermined course line, e. g., into an aerodrome.

Figure 8:
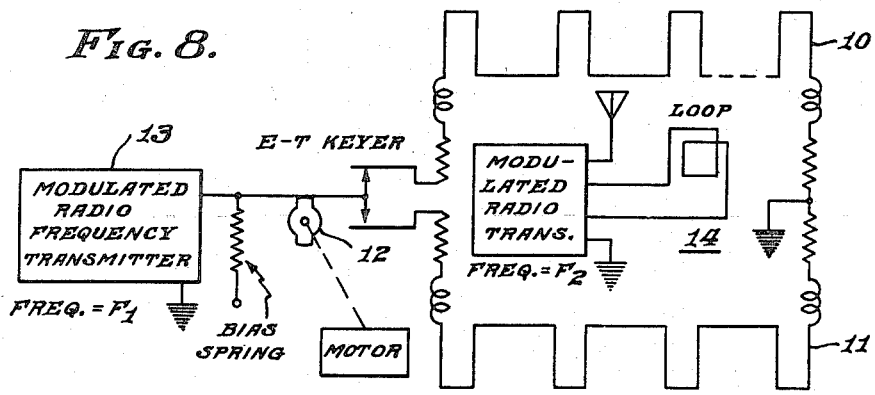
Figure 9:
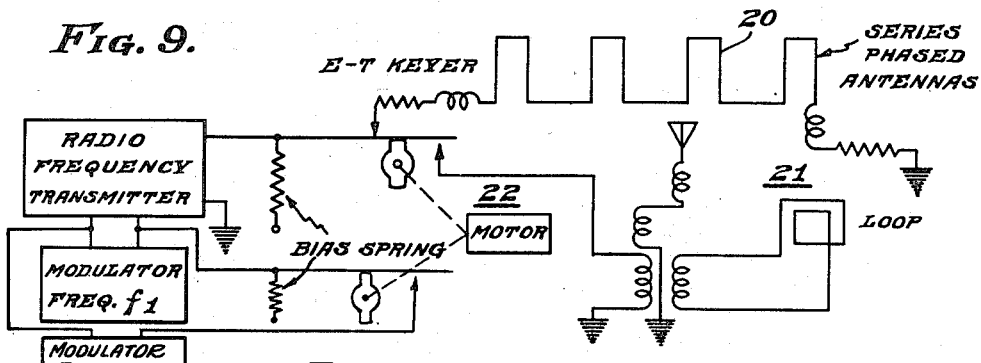
Figure 10:
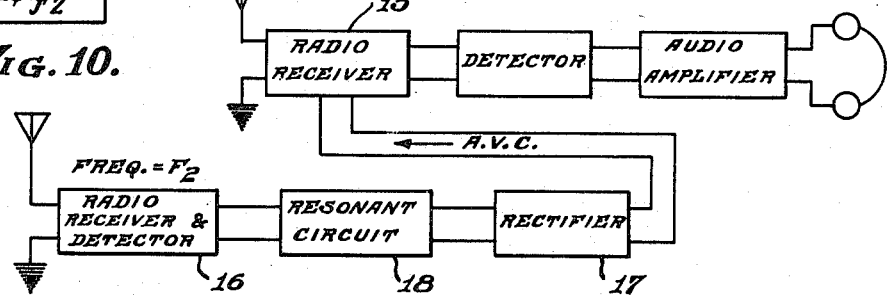
Figure 11:
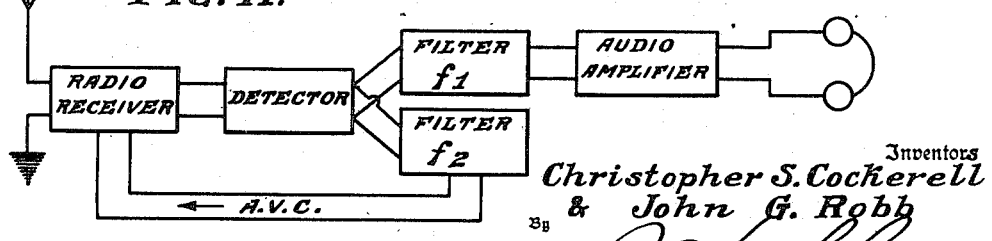

The invention will be described by reference to the accompanying drawings in which Figure 1 is a diagram of desired or "theoretical" fields from a transmitter radiating overlapping fields; Figure 2 is a diagram showing the overlapping fields from a directive transmitter; Figures 3 and 4 are diagrams indicating the field patterns established in accordance with the invention; Figures 5 and 6 are diagrams of field patterns established by a modified form of the invention, Figure 7 is an illustration of the angular distribution of signals in accordance with the invention; Figs. 8 and 9 are schematic diagrams of transmitters employed in two modifications of the invention; and Figs. 10 and 11 are schematic diagrams of the receivers used in following the equisignal paths.

One of the best known types of navigation-aiding radio systems for assisting the pilotage of aircraft or other vessels along a predetermined course line is that known as the equisignal type, i. e., of the type wherein different signals—usually interlocking sounds such as the Morse letters E and T—are transmitted in such manner that along a predetermined course or guiding line the two signals are received at equal strengths, one or other signal predominating upon divergence of the receiver in one or other direction from the guiding line. In the usual form of equisignal radio transmitter, the equisignal action is obtained by alternately transmitting the two signals in two angularly related directions, the polar diagrams corresponding to those directions overlapping slightly. The theoretically desired polar diagram which is indicated in conventional manner in the accompanying Figure 1 consists of fairly sharply directional lobes $L_1$, $L_2$ ($L_1$ may for example be a "dot" lobe and $L_2$ a "dash" lobe) in the two desired directions cooperating to define a predetermined equisignal or course line OX.

In practice, however, it is found very difficult, if not impossible, entirely to avoid the occurrence of additional smaller rearwardly directed lobes in the polar diagram. Such rearwardly directed lobes are represented at $l$ in the accompanying Figure 2 and it will be appreciated that they may easily give rise to errors, for it is possible for the pilot of an aircraft to imagine himself to be flying along the predetermined equisignal course, whereas in fact he is flying along a false equisignal course, such as OX' or OX" due to the cooperation of two of these minor rearward polar diagram lobes. It is, of course, possible to meet this difficulty by employing a more or less specially designed receiver which will not pick up signals corresponding to the rearward polar diagram lobes until the said receiver is very close indeed to the transmitter, but when standard radio receivers are employed—more especially those involving the otherwise desirable feature of automatic volume control—the said rearward lobes constitute a serious difficulty.

The present invention seeks to provide improved transmitters which will not present the defects of the known transmitters and this object is achieved, according to this invention in its broadest aspect, by providing, in addition to a highly directional transmission whereby a predetermined course line is defined a supplementary radiation which is not sharply directional but can be represented by a polar diagram of substantially circular or of substantially cardioid form, the radius of the circle, or the maximum radius of the cardioid being substantially less than the maximum radius of the polar diagram representing the main or highly directional transmission, the points of origin of the main transmission and of the supplementary radiation being substantially coincident. In use the supplementary radiation is employed, at an aircraft or other receiving installation, to control the receiver gain as respects reception of the main transmission so as to reduce said gain when the field strength (at the receiving installation) of the supplementary radiation exceeds a predetermined value.

According to one feature of this invention, a transmitting station in a navigating aiding radio system of the equisignal type comprises in addition to apparatus necessary for producing two different signals at equal strength along the predetermined desired equisignal line, apparatus for producing a supplementary radiation which can be represented by a substantially circular or by a substantially cardioid polar diagram, the radius of the circular diagram or the maximum radius of the cardioid diagram (as the case may be) being substantially greater than the length of the longest undesired lobes in the polar diagrams for the equisignal apparatus but substantially less than the length of the desired lobes in said polar diagram.

These two expedients are indicated conventionally in the accompanying Figures 3 and 4 respectively wherein SRC and CRS represent respectively a substantially circular and a substantially cardioid supplementary diagram. The supplementary transmission is utilized at the receiving installation to control the receiver gain for reception of signals from the equisignal apparatus so that the equisignal receiver is rendered insensitive to signals corresponding to the undesired or rearward lobes in the equisignal polar diagrams since if the receiving installation is in a position to receive signals corresponding to these lobes, it will also be in a position to receive the substantially more powerful supplementary radiation and, as above stated, the radiation is employed to reduce the equisignal reception sensitivity.

According to a second feature of this invention, a navigation aiding radio transmitter comprises apparatus for producing a main, highly directional radiation having marked directivity in a predetermined direction so that the principal characteristic of the polar diagram thereof is an elongated lobe, and apparatus for producing a supplementary radiation which can be represented by a polar diagram of substantially circular or of substantially cardioid form, the radius of the circle or the maximum radius of the cardioid (as the case may be) being substantially less than the length of the elongated lobe, means being provided for alternately transmitting different signals on the two radiations.

These two cases in accordance with the invention are represented in the accompanying Figures 5 and 6 respectively, in which L represents the main highly directional lobe, $l$ are the inevitable accompanying undesired rearward lobes and SRC (Figure 5) the CRS (Figure 6) represent a circular supplementary diagram and a cardioid supplementary diagram, respectively. The received energy corresponding to the supplementary radiation is of such a nature as to be separable at the receiving installation and is utilized at the receiver to effect gain control. For example, the supplementary radiation may be keyed at some predetermined characteristic rate or modulated by some predetermined characteristic frequency in which cases it may be on the same wave length as the main radiation, the required separation being effected by virtue of the characteristic keying or modulation. Alternatively, a different separate wave length may be used for the supplementary radiation, in which case, of course, it need not be keyed or modulated.

Where the supplementary radiation is on a different wave length from the main radiation and both wave lengths are to be received by and separated in the same receiver, the said wave lengths should be fairly close together, but it is possible to employ a separate receiver for the supplementary radiation in which case widely different wave lengths may be used. For example, in some navigation aiding radio systems "marker beacons" operating on a wave length different from that used to define a course line are situated on that line at different predetermined distances from the "home" or main transmitting station, the aircraft or other receiving installations being equipped with receivers for receiving the "marker beacon" radiations so that the pilot is informed of the progress of his approach to the "home" station. In applying the present invention to a system of this nature, the supplementary radiation provided by this invention could be on the "marker beacon" wave length and could be received by a "marker beacon" receiver suitably interconnected with the main receiver for receiving the highly directional radiation so as automatically to render the latter receiver insensitive when the former receiver receives supplementary radiation of more than a predetermined strength.

In one way of carrying out the first of the two features of invention above mentioned, there are employed at the transmitting station, see Fig. 8, two so-called "series phase" aerial arrays 10, 11 connected through the "E—T" keyer 12 to the radio transmitter 13 to transmit two signals alternately in two different angularly related directions so as to provide an equisignal zone or line along a predetermined course. This equisignal transmitting apparatus will produce a polar diagram as shown in Figure 2 consisting of a number of lobes radiated out from a central point. Two of these lobes $L_1$, $L_2$—the desired lobes, one of which corresponds to one signal (for example, dots) and the other to the other (for example, dashes)—are long narrow lobes but in addition to these lobes there will be produced a series of undesired much smaller lobes $l$ radiating outward in different rearward directions. There is also provided a supplementary aerial or aerial system 14 operating, in the specific embodiment now being described, on a carrier wave $F_2$ different from but near that employed for the equisignal transmission $F_1$ and modulated with a different frequency which may be very high or very low so that it will not affect the equisignal indicator means of or be heard in the telephones of a cooperating receiver. The supplementary aerial or aerial system is so positioned as to produce a circular or cardioid polar diagram (the loop is omitted to produce a circular field) whose radius or maximum radius (as the case may be) is about equal to the distance of the crossing point of the two desired lobes from the central point. In any event, this circular or cardioid diagram should be of low radius substantially less than the length of either of the two (equal) desired lobes $L_1$, $L_2$ and substantially greater than the length of the longest of the undesired lobes $l$. The resulting diagrams will accordingly be as already described with reference to Figures 3 and 4 respectively.

At the receiver 15 (see Fig. 10), the supplementary transmitted carrier with its characteristic different modulation frequency is received by a radio receiver 16 and the resultant signals utilized in any manner well known per se to control the carrier gain of the said receiver 15 as regards reception of the equisignal transmission. This automatic volume control may conveniently be obtained by connecting a rectifier 17 to a resonant circuit 18 tuned to the audio or other modulation employed for the supplementary transmission. With this arrangement, it will be seen that the sensitivity of the receiver for equisignal reception will depend entirely upon the distance of the receiver from the transmitter and accordingly pilotage errors due to undesirable lobes from the equisignal apparatus will be avoided.

One way of carrying out the second of the above-mentioned two features of invention is shown in Fig. 9. A so-called series phase broadside or other aerial array 20 is employed to produce a polar diagram as shown in Figures 5 and 6, whose principal feature is an elongated narrow lobe L in a predetermined direction. Operating upon the same wave length is a supplementary aerial or aerial system 21 adapted to produce a polar diagram consisting either of a circle SRC (Figure 5) or of a cardioid CRS (Figure 6) whose centre is at the point 0 from which the above-mentioned lobe extends, the radius of the circle or the maximum radius of the cardioid being substantially less than—for example about half—the length of the above-mentioned lobe. The loop is omitted if a circular pattern is desired. The supplementary and the highly directional aerial systems are switched by an "E—T" keyer 22 alternately and different signals ($b_1$, $b_2$) are transmitted from the two systems. For example, the supplementary system may be fed with Morse dashes and the directional system with Morse dots; the latter being modulated with signals $f_1$, and the former by signals $f_2$ or $f_2$ and $f_1$, as shown in Fig. 9.

The polar diagrams in the two systems will thus be as shown respectively in Figures 5 and 6 consisting in the main of the long narrow lobe L and the circle or cardioid SRC or CRS, the lobe L proceeding from the centre of the circle or cardioid and of course cutting the said circle or cardioid at two points. If a cooperating receiver is within a sector AOC lying between two radii, one of which passes through one intersection point of the lobe with the circle or cardioid and the other of which passes through the other intersection point, it will receive one of the two characteristic signals—for example, in the case above described, the dots—while a receiver anywhere else will receive the other of the two characteristic signals. In other words, if a directional diagram for dots and dashes be drawn, this diagram will consist as represented in the accompanying Figure 7 of a circle (or of a cardioid) having a small arc for dots and a larger one for dashes. If the dots and dashes are complementary interlocking signals, a receiver on either of the radii OA, OC, defining the sector AOC in which dots are received, will receive a continuous dash. In order that the minor lobes $l$ of Figures 5 and 6 may not give rise to false readings, the field strength from the supplementary system providing the diagram SRC or CRS should be greater than that corresponding to any of the undesired lobes $l$.

In the event that the controlling or automatic volume control transmitter is operated on the same radio frequency carrier as the directive transmitter, different modulations $f_1$, $f_2$ may be applied at the transmitter and filtered at the receiver as shown in Fig. 11.

Having now particularly described and ascertained the nature of our said invention and in what manner the same is to be performed, we declare that what we claim is:

1. A navigation aiding radio transmitter installation comprising means for radiating a highly directional transmission, said radiation having a distinctive frequency and a pattern representable by a polar diagram including at least one highly directional main lobe and subsidiary deleterious lobes, means for radiating a supplementary radiation, said supplementary radiation having a frequency distinguishable from said first mentioned frequency and a pattern which is not sharply directional but can be represented by a polar diagram of substantially circular form in the direction of said subsidiary lobes, the radius of the diagram in the direction of said subsidiary lobes being substantially less than the maximum radius of the polar diagram representing the highly directional transmission and substantially greater than said subsidiary lobes, the points of origin of the main transmission and of the supplementary radiation being substantially coincident, and means for distinguishing the highly directional transmission from the supplementary radiation other than by their respective polar diagrams so that the highly directive transmission becomes a directive radio course and the supplementary radiation forms a warning signal to indicate the deleterious subsidiary lobes.

2. A transmitter installation for establishing main and supplementary radiation including apparatus for producing a main, highly directional radiation having marked directivity in a predetermined direction so that the principal characteristic of the polar diagram thereof is an elongated lobe accompanied by undesired subsidiary lobes which have a deleterious effect upon the directional path of the highly directional main lobe, so that the signal transmitted by the highly directed radiation indicates the desired course and the signal transmitted by the suplementary radiation indicates the region including the undesired subsidiary lobes, whereby their deleterious effect may be avoided, apparatus for producing said supplementary radiation which can be represented by a polar diagram of substantially circular form, the radius of the circle being substantially less than the length of the elongated lobe and substantially greater than said subsidiary lobes in their direction, and means for alternately transmitting different signals on the two radiations.

3. In combination an installation as claimed in claim 1 and a cooperating receiver including means responsive to the received supplementary warning radiation for controlling the receiver gain as respects reception of the main transmission so as to reduce said gain when the field strength at the receiving installation of the supplementary radiation exceeds a predetermined value.

CHRISTOPHER SYDNEY COCKERELL.
JOHN GLOVER ROBB.